March 30, 1943. H. W. KOST 2,315,210
FASTENER
Filed April 10, 1941
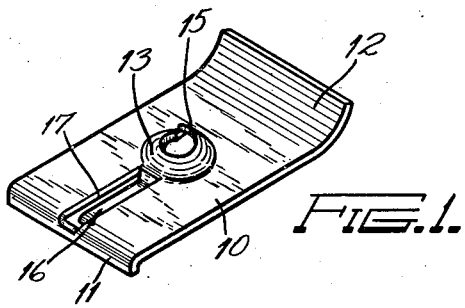
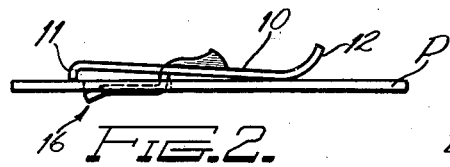
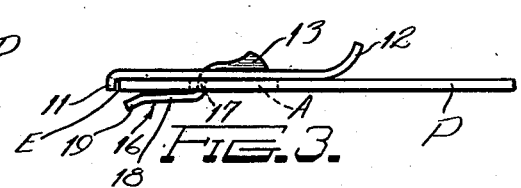
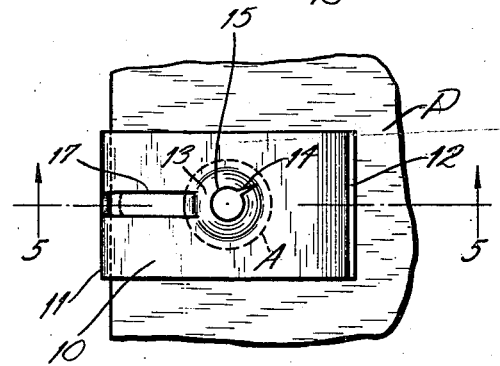
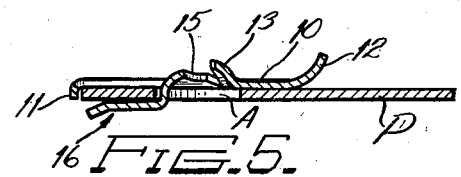
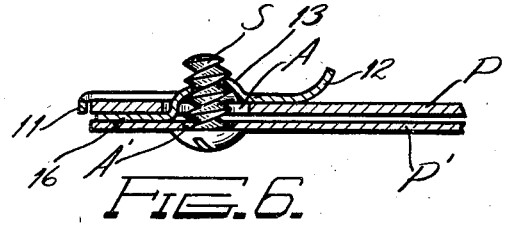
Inventor
HAROLD W. KOST
By Malcolm W. Fraser
Attorney Patented Mar. 30, 1943

2,315,210

UNITED STATES PATENT OFFICE 2,315,210

FASTENER

Harold W. Kost, Birmingham, Mich., assignor to Detroit Harvester Company, Detroit, Mich., a corporation of Michigan Application April 10, 1941, Serial No. 387,899

4 Claims. (Cl. 85—36)

This invention relates to fastening devices but more particularly to fasteners which are adapted to receive a plain or screw-threaded shank or stud for connecting together sheet metal panels and an object is to produce a simple and efficient fastener of this character which can be readily and conveniently mounted on an apertured supporting panel, the fastener having means extending through the aperture in the general direction toward one end of the fastener for gripping one side of the supporting panel and separate means on such end of the fastener for retaining the fastener from longitudinal movement in one direction as well as rotative movements.

Another object is to produce a one-piece sheet metal fastener which can be readily applied to an apertured supporting panel, one portion of the fastener engaging an edge of the supporting panel and another portion in the region of such engaging portion for cooperating with the body of the fastener to clamp the panel therebetween.

A further object is to produce a unitary sheet metal fastener of the above character which is inexpensive to manufacture, easy to apply, and has the new and improved features of construction for retaining it in the desired position upon the supporting panel prior to and during the application of the bolt or stud.

An embodiment of the invention is shown on the accompanying drawing by way of illustration but not of limitation and in such drawing Figure 1 is a perspective view of the fastener;

Figure 2 is a side edge view showing the fastener being applied to a supporting panel;

Figure 3 is an edge view showing the fastener in place upon a supporting panel;

Figure 4 is a top plan view of the fastener mounted on a supporting panel;

Figure 5 is a longitudinal sectional view substantially on the line 5—5 of Figure 4; and Figure 6 is a sectional view similar to Figure 5 but showing a panel attached to the fastener supporting panel, a screw passing through both panels in threaded engagement with the fastener.

The illustrated embodiment of the invention comprises a one-piece sheet metal fastening device having a substantially rectangular flat body 10 which has a downturned flange or lip 11 at one end thereof. The opposite end of the body is bent upwardly as indicated at 12 to provide a convenient hand-hold for use in applying the fastener to the supporting panel. Arranged approximately in the center of the body 10 is an outwardly pressed substantially frusto-conical protuberance 13 which has a radial slit 14. On the outer end of the protuberance is a screw thread receiving opening 15, the edge of which is of helical form to engage one complete thread of a screw. The screw thread receiving portion may be of the form shown and described in the patent to Harold W. Kost No. 2,169,182, dated August 8, 1939, although it is to be understood that other forms of screw or stud engaging portions may be used to advantage, and it is not my intention that the invention is limited solely to the screw thread receiving portion shown on the accompanying drawing.

Struck from the body 10 is a tongue 16 thereby forming a longitudinally elongate slot 17 in the body 10. The tongue 16 is integral with the body 10 in the region juxtaposed to the base of the screw-receiving protuberance 13 and the free end of the tongue extends in a general direction toward the lip or flange 11. It will be observed that the tongue has a downwardly extending portion 17 with which merges a portion 18, the latter extending approximately in parallel relationship to the body 10. To facilitate application of the fastener, the outer or free end portion 19 of the tongue 16 inclines downwardly or in a direction away from the body 10.

The fastener is adapted to be mounted on a supporting panel P which has a screw or stud receiving aperture A disposed adjacent an edge portion E. As indicated in Figure 2, the tongue 16 is inserted into the aperture A, the downwardly inclined end portion 19 facilitating the engagement of the tongue 16 with the underside of the panel P. The fastener is then bodily shifted longitudinally until the lip or flange 11 snaps over the edge E. The panel P is snugly gripped between the body portion 10 and the tongue 16, and longitudinal movement of the fastener in one direction is prevented by the lip 11 and in the opposite direction by the shoulder formed by the downwardly extending portion 17 of the tongue 16. Rotative or turning movement of the fastener is prevented by the engagement of the lip 11 with the edge E of the supporting panel, the lip extending entirely across the narrow dimension of the fastener.

It will be apparent that the elements of the fastener are so arranged that when it is in applied position, the opening 15 is in registration with the aperture A. This enables a panel P' (Figure 6) to be applied to the underside of the panel P, there being an opening A' in the panel P' which is in alignment with the aperture A so that a screw S may be inserted therethrough and into threaded engagement with the edge of the opening 15. Upon tightening of the screw, the panels P and P' will be drawn toward each other as will be readily apparent. In view of the construction of the fastener it will be obvious that insertion of the screw S can be readily accomplished since the aperture in which the screw is inserted is visible during the application of the screw to fastening position.

It is to be understood that numerous changes in details of construction, arrangement and operation may be effected without departing from the spirit of the invention especially as defined in the appended claims.

What I claim is:

1. A fastener comprising a sheet metal body, a shank engaging portion on said body, a downturned flange on said body to engage an edge of a supporting panel for militating against turning of the body with respect to the panel, said flange having its free end portion disposed at approximately right angles to said body, and a tongue struck from the body and extending along the underside of the body with the free end thereof projecting in a direction toward said flange thereby to enable the tongue to be inserted through a shank-receiving aperture of the panel to engage one side of the supporting panel and the body to engage the other side thereof for cooperating with the flange to hold the fastener in place.

2. A fastener for mounting on an apertured panel, said fastener comprising a sheet metal body, a shank-engaging portion integral with said body adapted to be positioned substantially in register with the panel aperture, a downturned flange on said body to engage an edge of the panel and cooperate therewith for holding the body against shifting movements rotatively and longitudinally in one direction, said flange having its free end portion disposed at approximately right angles to said body, and means for holding the body upon the panel and against longitudinal shifting movement in the opposite direction, said holding means comprising a tongue struck out of said body with one end terminating in the region of said shank engaging portion and with the free end extending in the general direction of said flange, thereby to enable the tongue to be first inserted into the panel aperture and the body moved along the supporting panel until the flange engages over the edge thereof.

3. A fastener for mounting on an apertured panel, said fastener comprising a sheet metal body, a shank engaging portion integral with said body adapted to be positioned substantially in register with the panel aperture, a downturned flange on one edge of said body to engage an edge of the panel and cooperate therewith for holding the body against shifting movements rotatively and longitudinally in one direction, said flange having its free end portion disposed at approximately right angles to said body, means for holding the body upon the panel and against longitudinal shifting movement in the opposite direction, said holding means comprising a tongue struck from said body and adapted to project through the panel aperture, said tongue having its free end extending in the general direction of said flange, and an upturned flange at the opposite end of said body affording a finger hold for use in applying the fastener.

4. A fastener for mounting on an apertured panel, said fastener comprising a substantially flat sheet metal body, a screw thread receiving portion integral with and projecting from one side of said body and adapted to be positioned substantially in register with the panel aperture, an integral downturned flange on one edge of said body to engage an edge portion of the panel and cooperate therewith for holding the body against rotative movement and longitudinal shifting movement in one direction, said flange having its free end portion disposed at approximately right angles to said body, and a tongue struck from said body intermediate said screw thread engaging portion and said flange and depressed from said body thereby to engage the underside of the panel through the panel aperture, said tongue having the free end thereof extending toward said flange.

HAROLD W. KOST.